Dec. 29, 1925.

G. F. VOIGHT

FILLING CAN

Filed March 23, 1925

INVENTOR

George F. Voight

Dec. 29, 1925.  G. F. VOIGHT  1,567,476
FILLING CAN
Filed March 23, 1925  2 Sheets-Sheet 2
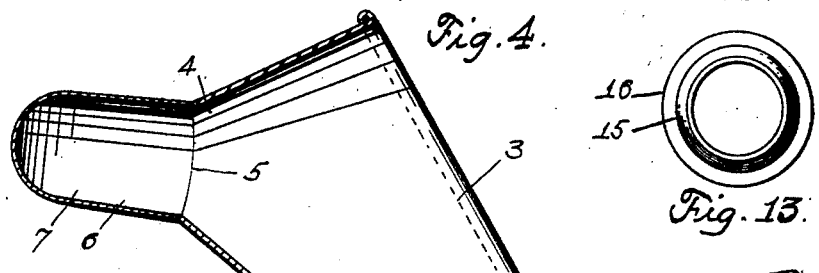
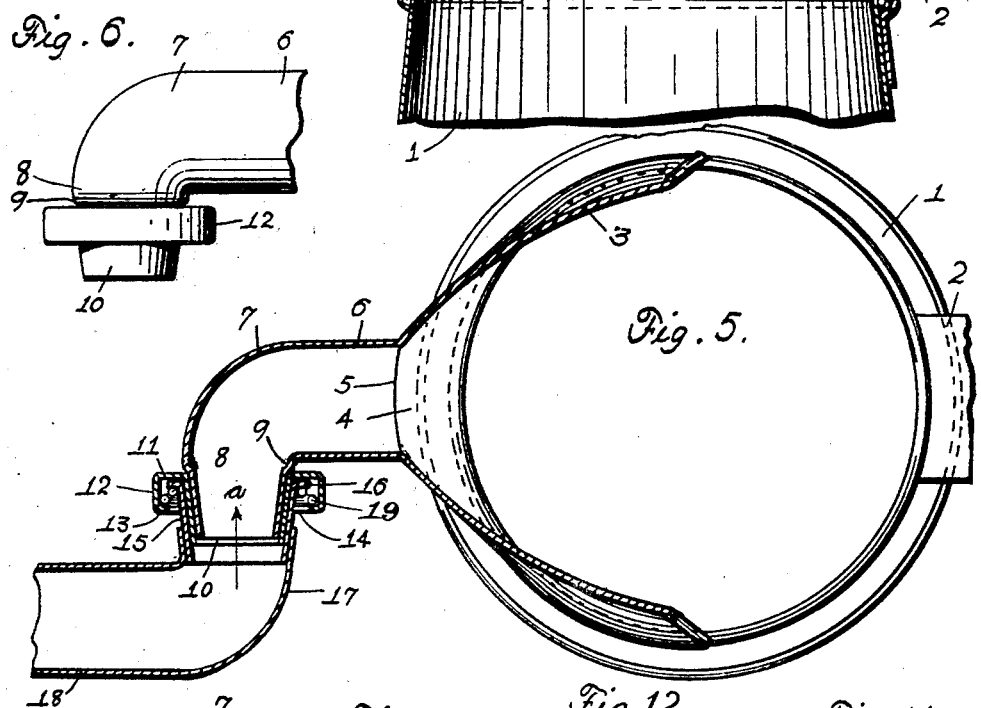
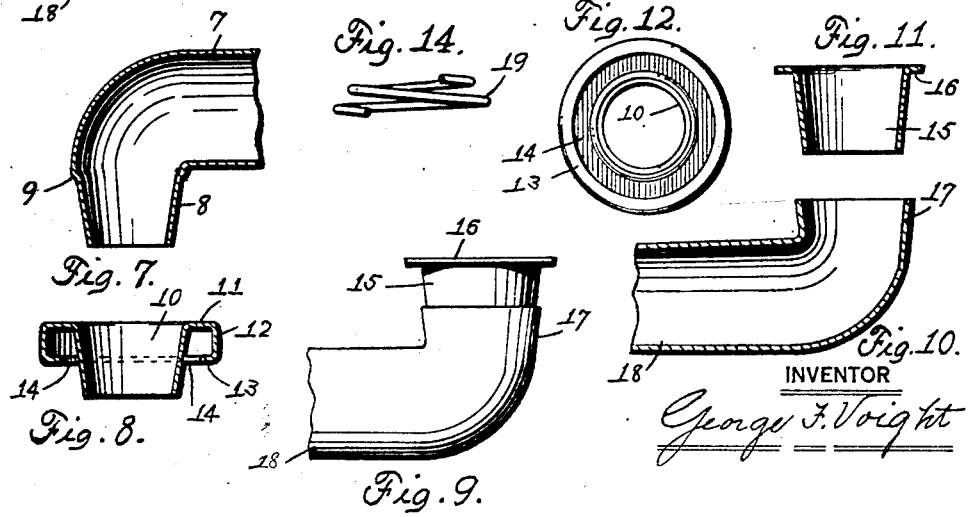
INVENTOR
George F. Voight Patented Dec. 29, 1925.

1,567,476

UNITED STATES PATENT OFFICE.

GEORGE F. VOIGHT, OF OAKLAND, CALIFORNIA.

FILLING CAN.

Application filed March 23, 1925. Serial No. 17,639.

*To all whom it may concern:*

Be it known that I, GEORGE F. VOIGHT, a citizen of the United States, residing at Oakland, in the county of Alameda and State of California, have invented new and useful Improvements in Filling Cans, of which the following is a specification.

My invention relates to filling cans particularly adapted for delivering oil into the oil ports of automobile engines, although also useful for other purposes.

One of the objects of the invention is the provision of a filling can open at its upper end for the reception and discharge of its contents, having a drain-funnel secured to the forward margin of said opening, the drain-funnel having a discharge spout rotatably supporting a delivery spout.

A further object is the provision of a drain-funnel having a discharge spout, the outlet end of which disposed substantially at right angles with the inlet end, the said outlet end rotatably supporting a delivery spout.

A still further object is to provide the outlet end of the discharge spout with a tapering outlet sleeve rotatably supporting a tapering inlet sleeve on the inlet end of the delivery spout.

A still further object is the provision of a filling can having a discharge spout rotatably supporting a delivery spout, the latter rotatable from a vertical position with the outlet end projecting downwardly, approximately 270 degrees to an approximate horizontal position with its outlet end extending back of the body of the can.

With the foregoing and still further objects and purposes in view which will appear as the description proceeds, my invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings—

Figure 4 is a median vertical sectional view of the upper end of the can;

Figure 5 is a view approximately on line 5'—5', Fig. 1;

Figure 6 is a top plan view of the outlet end of the discharge spout and outlet sleeve;

Figures 7 and 8 are horizontal sectional views of the outlet end of the discharge spout and the outlet sleeve, respectively;

Figure 9 is a top plan view of the inlet end of the delivery spout and inlet sleeve;

Figures 10 and 11 are horizontal sectional views of a portion of the delivery spout and the inlet sleeve;

Figures 12 and 13 are end views of the outlet and inlet sleeves, respectively, looking in the direction indicated by the arrow "a", Fig. 5;

Figure 14 is a compression spring employed for holding the inlet sleeve on the outlet sleeve under tension.

Referring to the drawings in detail, throughout which like reference characters designate like parts:

Figure 1:
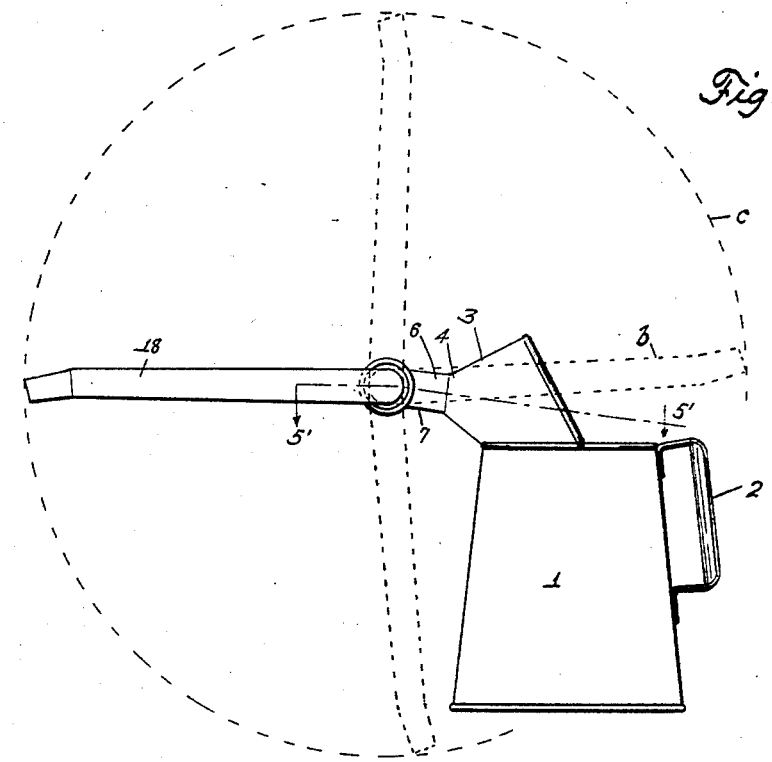
Figure 1 is a side elevation of a filling can constructed in accordance with my invention, showing the delivery spout swung forwardly into a horizontal position.
Figure 2:
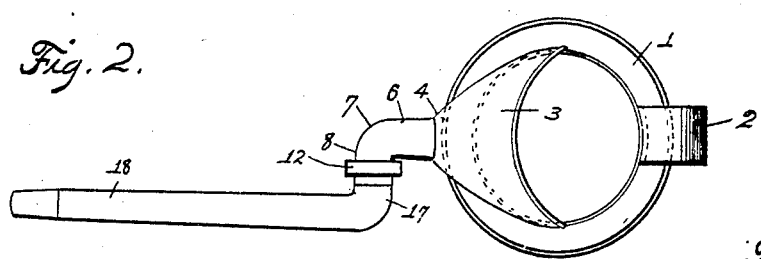
Figure 2 is a top view of the can with the delivery spout swung forwardly.

The numeral 1 designates the body portion of the can, which is open at its upper end, and for convenience in handling is provided with a handle 2.

To facilitate describing the construction and operation of my improved filling can, the side of the can provided with the handle 2, is considered to be the rear of the can, the side diametrically opposite said handle the front thereof, and the two opposite sides intermediate said front and rear are considered to be the sides thereof.

To the margin of the upper end of the body portion 1 is secured a drain-funnel 3, which covers the forward portion of said upper end and converges conically to a constricted portion 4, which projects a distance forwardly beyond the front of the can and is provided with a cylindrical outlet opening 5.

To the margin of the opening 5 is rigidly secured the intake end 6 of an angular, tubular, discharge spout 7. The axis of said intake end being in the plane of said opening 5 and the handle 2, while the axis of its outlet end 8 extends at right angles with said plane. Said outlet tapers towards its free end and is constricted diametrically thereby forming an annular shoulder 9 adjacent its intersection with said intake end 6.

10 designates a tapering outlet sleeve, into which projects and is rigidly secured the tapering end of the discharge spout 7, and which is provided at its enlarged end with an angular, annular, sleeve flange 11, which terminates angularly into a cylindrical housing 12 terminating in an inwardly extending housing flange 13. The latter terminates short of the sleeve 10, thereby providing an annular opening 14 intermediate said sleeve and the flange 13.

15 designates a tapering intake sleeve, into the enlarged end of which is rotatably fitted the outlet sleeve 10, and which is provided at said enlarged end with an annular flange 16, which is projectable through the opening 14 for mounting said intake sleeve on the outlet sleeve 10. The converging or constricted end of the intake sleeve 15 is rigidly secured in the intake end 17 of a relative long delivery spout 18, the axis of which being approximately at right angles with the axis of the sleeves 10 and 15.

19 designates a compression spring, which encircles the sleeve 15 and is confined under compression between the flanges 13 and 16, whereby the sleeves 10 and 15 are held in relative wearing, rotatable, contact.

The pitch or degree of taper of the sleeves 10 and 15 is preferably the same so as to permit of a snug fit therebetween, and the pressure of the spring 19 pressing against the flanges 13 and 16 in opposite directions, is intended to be such as to cause sufficient binding of the sleeve 15 against the periphery of the sleeve 10 to be normally frictionally held thereon against rotation relative thereto, but operatively rotatable thereon when proper force is applied to the spout 18 for swinging it in either direction about the axis of said sleeves. Said binding of the sleeve 15 on the sleeve 10 is also intended to provide a "leak-proof" joint between these parts.

Figure 15:
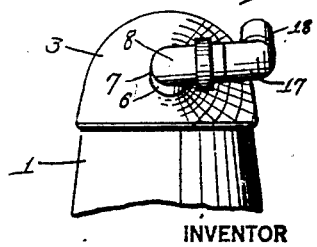
Figure 15 is a front elevation of the upper portion of the can.

The discharge spout 7 inclines upwardly in a direction outwardly from the can, as best shown in Figs. 1 and 4. This upward inclination is continued throughout the outlet end 8 of said spout and the end 17 of the delivery spout 18 (see Fig. 15). The object of these upward inclinations of said spout 7 and ends 8 and 17, is for the purpose of providing backward drainage into the body of the can, of any oil that may cling to the interior sides of said spout and ends after the discharge of the contents of the can therethrough. Such back drainage into the can is also applicable to the delivery spout 18 by elevating the free end thereof above the level of its inner end 17.

Figure 3:
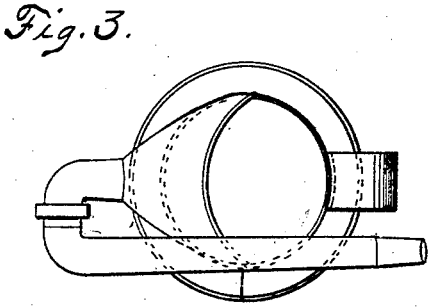
Figure 3 is a top view of the can with the delivery spout swung rearwardly.

The delivery spout 18 may be considered to be in its relative normal position when rotated rearwards along one side of the drain-funnel 3, with its free end slightly elevated and projecting back of the body portion of the can (see Fig. 3 and broken line "b" of Fig. 1). From this position, the free end of the delivery spout may be swung into any position along the broken line "c" found convenient for inserting it into the oil port of the engine or the like, after which the can may be oscillated forwardly until the contents flow over the rim of its upper end through the drain-funnel 3 and out through the spouts 7 and 18.

I claim:

1. The combination with the drain funnel of a filling can of the class described, said drain funnel having a converging portion disposed above said can and projecting a distance beyond the front side thereof, of a discharge spout having one end rigidly secured to the apex of said converging portion, the opposite end of said spout being curved around to one side to form a side outlet portion therefor, said outlet portion tapering towards its free end, a delivery spout having one end curved around to one side to form a side intake portion, said intake portion diverging towards its free end, said intake portion rotatably mounted on said outlet portion, and a spring for holding said outlet and intake portions in relative rotatable engagement, said delivery spout operatively swingable along one side of said drain funnel.

2. In a filling can of the character described, a body portion open at its upper end for the reception and discharge of its contents, a drain funnel rigidly connected to said upper end and over-hanging one side of said opening, a discharge spout integrally connected to the forward portion of said drain funnel, and a delivery spout rotatably supported by the forward portion of said discharge spout, said delivery spout being swingable rearwardly into contact with said drain funnel below the top thereof.

3. In a filling can of the character described, a body portion open at its upper end for the reception and discharge of its contents, a drain funnel rigidly secured to said upper end and over-hanging the forward portion of said opening, a discharge spout rigidly connected to said drain funnel, a delivery spout rotatably supported on said discharge spout, said discharge spout having an outlet extension on one side, and a delivery spout having an intake extension on one side rotatably fitted on said outlet extension, said discharge spout and said extensions disposed in a plane crossing the axis of said body portion at approximately right angles therewith, said delivery spout being operatively swingable along one side of said drain funnel.

4. In a filling can of the character described, a body portion, a drain funnel firmly secured thereto and projecting thereabove, a discharge spout rigidly secured to said drain funnel, and a delivery spout rotatably supported on the free end of said discharge spout, said delivery spout swingable from a horizontal position in which its free end projects forwardly beyond the front side of the body portion to an approximate horizontal position in which said free end projects rearwardly beyond the rear side of said body portion.

5. In a filling can of the character described, a body portion having a drain funnel rigidly secured to its upper end and over-hanging the forward portion thereof, said drain funnel having a constricted portion disposed above said upper end and projecting forwardly beyond the front side thereof, a tubular discharge spout rigidly secured to said constricted portion of said drain funnel, the free end of said discharge spout bent laterally to one side, and a tubular delivery spout having one end mounted rotatably on said free end of the discharge spout.

6. In a filling can of the character described, a discharge spout having a discarge sleeve rigidly secured to one end thereof, a delivery spout rotatably mounted on said sleeve, and a coil spring encircling said sleeve and said delivery spout and pressing thereagainst in opposite directions for holding the latter spring-pressed against the former.

7. The combination with the drain funnel of a filling can of the class described, said funnel having a constricted portion disposed above the body portion of said can and projecting beyond the front side thereof, of a delivery spout, and a connection between said delivery spout and said constricted portion of the drain funnel, the arrangement being such that said delivery spout may be operatively swung along one side of said drain funnel with the free end of said delivery spout disposed to extend beyond the rear side of said body portion.

8. In a filling can of the character described, a body portion, a drain funnel rigidly secured to the upper end thereof and projecting thereabove, said drain funnel having a constricted portion projecting forwardly beyond the front side of said body portion and above the same, a rigid tubular discharge spout having one end rigidly secured to the apex of said constricted portion, the free end of said discharge spout being upwardly inclined, and a rigid tubular delivery spout having one end journaled on the free end of said discharge spout, said delivery spout operatively swingable along one side of said drain funnel, whereby one end of said delivery spout will be disposed to project forwardly beyond the front of said body portion and the opposite end thereof disposed to project rearwardly beyond the rear side of said body portion.

In testimony of the foregoing being my own, I have hereunto affixed my signature this 16th day of March, 1925.

GEORGE F. VOIGHT.